F. S. SMITH.

Assignor, by direct and mesne assignments, to H. THOMAS, W. F. THOMAS and L. C. LAURENT.

FENCE POST.

No. 10,471. Reissued Apr. 22, 1884.

WITNESSES

Wm A. Skinkle

R. E. Nash

INVENTOR

Fannie S. Smith.

Their Attorneys

Dodge, Brown, Hopkins, & Peyton.

UNITED STATES PATENT OFFICE.

FANNIE S. SMITH, OF TOPEKA, KANSAS, ASSIGNOR, BY DIRECT AND MESNE ASSIGNMENTS, TO H. THOMAS AND W. F. THOMAS, OF SAME PLACE, AND L. C. LAURENT, OF SHAWNEE COUNTY, KANSAS.

FENCE-POST.

SPECIFICATION forming part of Reissued Letters Patent No. 10,471, dated April 22, 1884.

Original No. 292,141, dated January 15, 1884. Application for reissue filed February 29, 1884.

*To all whom it may concern:*

Be it known that I, FANNIE S. SMITH, a citizen of the United States, and a resident of Topeka, in the county of Shawnee and State of Kansas, have invented certain new and useful Improvements in Fence-Posts; and I do hereby declare that the following is a full, clear, and exact description of the invention, which will enable others skilled in the art to which it appertains to make and use the same, reference being had to the accompanying drawings, which form a part of this specification, and in which—

Figure 1:
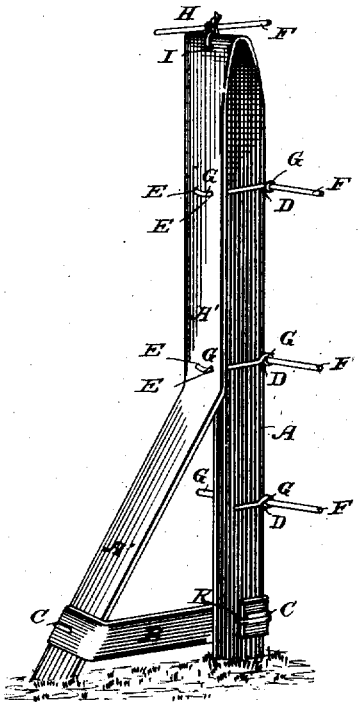
Figure 2:
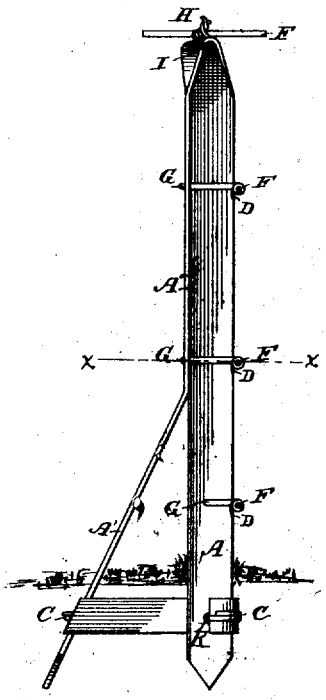

Figure 1 is a perspective view of my improved fence-post. Fig. 2 is a side view of the same; and Fig. 3 is a cross-sectional view on line *x x*, Fig. 2.

Similar letters of reference indicate corresponding parts in all the figures.

My invention has relation to a metallic fence-post; and it consists of a post formed of a single metal strap or bar, bent at about the middle (or at the point to form the top of the post,) and doubled, then one part being given a quarter-turn, and the two parts below the bend being brought in contact and fastened securely together to form a strong standard or body for the post, and then separated below so as to form a broad base or support for the body of the post and to enter the ground apart from each other and be braced or anchored by a horizontal connecting-piece, substantially as hereinafter set forth more in detail, and then succinctly stated in substance in my claims appended hereto.

Figure 3:
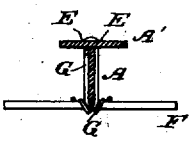

In the accompanying drawings A A′ represent a single piece of heavy band-iron, bent at about the middle of its length in such a manner that when the two parts A and A′ are brought together they are at right angles to each other, the upper part of the post being T-shaped, as will be clearly seen by reference to Fig. 3 of the drawings. The part A′ has its lower end bent out at an angle from the principal part A, and is held in that position by a connecting-brace, B, also made of band-iron. This brace serves to strengthen the lower part of the post, and has its ends bent to fit around the parts A and A′ of the post, and is held in position by ~~means of~~ wires C C, which pass through holes K, pierced through the ends of the brace and the ends of the parts A and A′, and are then twisted around the parts A A′ in the manner shown in the drawings.

D D D represent notches or grooves on the outer edge of the principal part A of the post, into which the fence-wires F, which extend from post to post, fit. The part A′ of the post is pierced with holes E E opposite each of the notches or grooves D, through which the ends of a piece of wire, G, are passed, the holes being so placed that the ends of the wire will pass—one on each side of the part A—the ends of the wire crossing each other at the edge of the part A, and being then twisted around the fence-wire F, as clearly shown in Fig. 3 of the drawings. The tying-wires G thus serve to bind the upper parts of the post firmly together, and also serve to hold the fence-wire in its position in the grooves D. The tying-wire which secures the lower fence-wire passes through a hole in the part A, its ends being secured around the fence-wire in the manner described. The wire H, passing through holes I in the top of the post, serves to hold the parts A A′ firmly together at the point where they are bent or twisted, and also serves to hold the top fence-wire in position, as shown in the drawings. The ends of the parts A A′ are pointed or sharpened for convenience in inserting the post into the ground. The post is forced into the ground until the top of the connecting-brace or anchor B is just either above or below the surface, as desired.

From the foregoing description, taken in connection with the accompanying drawings, the construction of my improved fence-post will readily be understood without requiring extended explanation.

It will be seen that my improved fence-post is simple in construction, and, being made out of band or strap iron, it can be sold at an extremely low price, thus forming a cheap and serviceable post.

I do not limit myself to the precise form of embodiment herein shown, because some changes are possible without departing from the substance of my invention.

Having thus described my invention, I claim and desire to secure by Letters Patent of the United States—

1. A metallic fence-post consisting of the standard formed by the parts A and A′ in one piece, disposed at right angles to each other, and having holes K E I, and notches D, connecting-brace B, and wire-ties C G H, all constructed and combined substantially as and for the purpose shown and described.

2. As an improved article of manufacture, a metallic fence-post formed of a single bar or strap bent at the point constituting the top of the post and doubled, one part having a quarter-turn, and the two parts being in contact and secured together to form the post-body, but being separated below so that the two may enter the ground apart from each other, thus forming a broad base for the post, the said two separated lower parts being tied or stayed by a horizontal brace, all substantially as set forth.

As witness my hand this 2d day of February, 1884.

FANNIE S. SMITH.

Witnesses:

R. A. HENDERSON,

EDWARD CHILSON.